(12) United States Patent
Zhang et al.

(10) Patent No.: US 9,990,050 B2
(45) Date of Patent: **\*Jun. 5, 2018**

(54) DYNAMIC HAND GESTURE RECOGNITION USING DEPTH DATA

(71) Applicant: Microsoft Technology Licensing, LLC, Redmond, WA (US)

(72) Inventors: Zhengyou Zhang, Bellevue, WA (US); Alexey Vladimirovich Kurakin, Moscow (RU)

(73) Assignee: Microsoft Technology Licensing, LLC, Redmond, WA (US)

( \* ) Notice: Subject to any disclaimer, the term of this patent is extended or adjusted under 35 U.S.C. 154(b) by 0 days. days.

This patent is subject to a terminal disclaimer.

(21) Appl. No.: 15/334,269

(22) Filed: Oct. 25, 2016

(65) Prior Publication Data

US 2017/0045952 A1 Feb. 16, 2017

Related U.S. Application Data

(63) Continuation of application No. 13/526,501, filed on Jun. 18, 2012, now Pat. No. 9,536,135.

(51) Int. Cl.
*G06K 9/00* (2006.01)
*G06F 3/01* (2006.01)
*G06K 9/62* (2006.01)

(52) U.S. Cl.
CPC ......... *G06F 3/017* (2013.01); *G06K 9/00355* (2013.01); *G06K 9/6277* (2013.01); *G06K 9/6297* (2013.01)

(58) Field of Classification Search
None
See application file for complete search history.

(56) References Cited

U.S. PATENT DOCUMENTS

| | | | |
|---|---|---|---|
| 5,581,276 A | 12/1996 | Cipolla et al. | |
| 6,788,809 B1 | 9/2004 | Grzeszczuk et al. | |
| 2001/0034736 A1 | 10/2001 | Eylon et al. | |
| 2004/0189720 A1 | 9/2004 | Wilson et al. | |
| 2010/0071965 A1 | 3/2010 | Hu et al. | |
| 2010/0166258 A1 | 7/2010 | Chai et al. | |
| 2013/0236089 A1 | 9/2013 | Litvak et al. | |
| 2013/0278504 A1 | 10/2013 | Tong et al. | |
| 2014/0049465 A1 | 2/2014 | Tremaine et al. | |

OTHER PUBLICATIONS

"Final Office Action Issued in U.S. Appl. No. 13/526,501", dated Sep. 10, 2014, 14 Pages.

(Continued)

*Primary Examiner* — Nirav G Patel

(57) ABSTRACT

The subject disclosure is directed towards a technology by which dynamic hand gestures are recognized by processing depth data, including in real-time. In an offline stage, a classifier is trained from feature values extracted from frames of depth data that are associated with intended hand gestures. In an online stage, a feature extractor extracts feature values from sensed depth data that corresponds to an unknown hand gesture. These feature values are input to the classifier as a feature vector to receive a recognition result of the unknown hand gesture. The technology may be used in real time, and may be robust to variations in lighting, hand orientation, and the user's gesturing speed and style.

20 Claims, 8 Drawing Sheets

(56) References Cited

OTHER PUBLICATIONS

"Final Office Action Issued in U.S. Appl. No. 13/526,501", dated Jun. 16, 2015, 22 Pages.
"Final Office Action Issued in U.S. Appl. No. 13/526,501", dated Apr. 19, 2016, 26 Pages.
"Non-Final Office Action Issued in U.S. Appl. No. 13/526,501", dated Feb. 27, 2014, 16 Pages.
"Non-Final Office Action Issued in U.S. Appl. No. 13/526,501", dated Nov. 4, 2015, 22 Pages.
"Non-Final Office Action Issued in U.S. Appl. No. 13/526,501", dated Feb. 13, 2015, 22 Pages.
"Notice of Allowance Issued in U.S. Appl. No. 13/526,501", dated Aug. 25, 2016, 8 Pages.
Elmezain, et al., "A Hidden Markov Model-Based Isolated and Meaningful Hand Gesture Recognition", In Proceedings of World Academy of Science, Engineering and Technology, 2008, 8 pages.
Suryanarayan, et al., "Dynamic Hand Pose Recognition using Depth Data", In Proceedings of 20th International Conference on Pattern Recognition, Aug. 23-26, 2010, 4 pages.
Knight, et al., "A Framework for Recognizing Hand Gestures", In CS 229: Machine Learning Final Projects, Dec. 10, 2010, 5 pages.
Meena, Sanjay, "A Study on Hand Gesture Recognition Technique", A Thesis Submitted in Partial Fulfillment of the Requirements for the Degree of Master of Technology in Telematics and Signal Processing, 2011, 65 pages.
Hamer, et al., "An Object-Dependent Hand Pose Prior from Sparse Training Data", In Proceedings of IEEE Conference on Computer Vision and Pattern Recognition, Jun. 13-18, 2010, 8 pages.
Tang, Matthew, "Recognizing Hand Gestures with Microsoft's Kinect", Nov. 2, 2011, 12 pages.
Ren, Zhou, Junsong Yuan and Zhengyou Zhang, "Robust hand gesture recognition based on finger-earth mover's distance with a commodity depth camera", Proceedings of the 19th ACM international conference on Multimedia, ACM, 2011, 4 pages.

DYNAMIC HAND GESTURE RECOGNITION USING DEPTH DATA

CROSS-REFERENCE TO RELATED APPLICATION

This application is a continuation of U.S. patent application Ser. No. 13/526,501, filed Jun. 18, 2012, which is hereby incorporated by reference herein for all purposes.

BACKGROUND

Significant amounts of research and development have been performed with respect to gesture recognition using video and image processing, and more recently, depth sensor data. For example, Microsoft Corporation's Kinect™ device provides a skeletal tracking system, allowing the design of games with body gestures as an interaction mode.

In contrast to skeletal tracking/body gesture recognition, hand gestures are more difficult to recognize because hand motions are more subtle and there are considerable occlusions between the fingers. However, hand gestures convey significant information and are commonly used for human to human communication. This is likely because hand gestures feel natural to humans, and indeed, hand gestures are often used instinctively and subconsciously.

Known attempts at recognizing hand gestures have not been particularly successful. For example, one depth-based gesture recognition system was limited to recognizing static gestures, in which the user had to wear a black wrist band in order to facilitate clear hand segmentation. Another recognition system was dynamic, but was very limited, as only a few gestures were able to be recognized by the system's rule-based classification of shapes and trajectories of the moving hand; further the system was not able to adapt to different hand orientations.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which hand movement is recognized as a hand gesture based upon the feature values extracted from a plurality of frames of depth data. In one aspect, this includes processing the depth data for detecting a hand represented in the depth data, and extracting feature values corresponding to the hand.

In one aspect, processing the depth data comprises segmenting the hand to isolate the hand from among other regions of the depth data. Processing the depth data also may comprise compensating for a relative orientation and/or size of the hand.

In one aspect, extracted feature value sets may be based upon hand velocity data, one or more hand rotation parameters, and/or at least one shape descriptor. The shape descriptor feature values may be based upon one or more occupancy features and/or one or more silhouette features.

A classifier may be trained from feature values extracted from frames of depth data that are associated with intended hand gestures. A feature extractor extracts feature values from sensed depth data that corresponds to an unknown hand gesture. These feature values (or a subset thereof) may be represented as feature data (e.g., a vector) input to the classifier to receive a recognition result of the unknown hand gesture.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a dynamic hand gesture recognition technology that is scalable, automatic and does not require a user to wear special equipment. The technology may be used in real time, and is robust to variations in lighting, hand orientation, and the user's gesturing speed and style. In one aspect, scalability is achieved by using a data-driven system in which a significant number of hand gestures are able to be learned and recognized by processing training data.

It should be understood that any of the examples herein are non-limiting. For example, example training mechanisms and classifiers are described, but any other machine learning algorithms and/or recognition systems may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and dynamic recognition in general.

Figure 1:
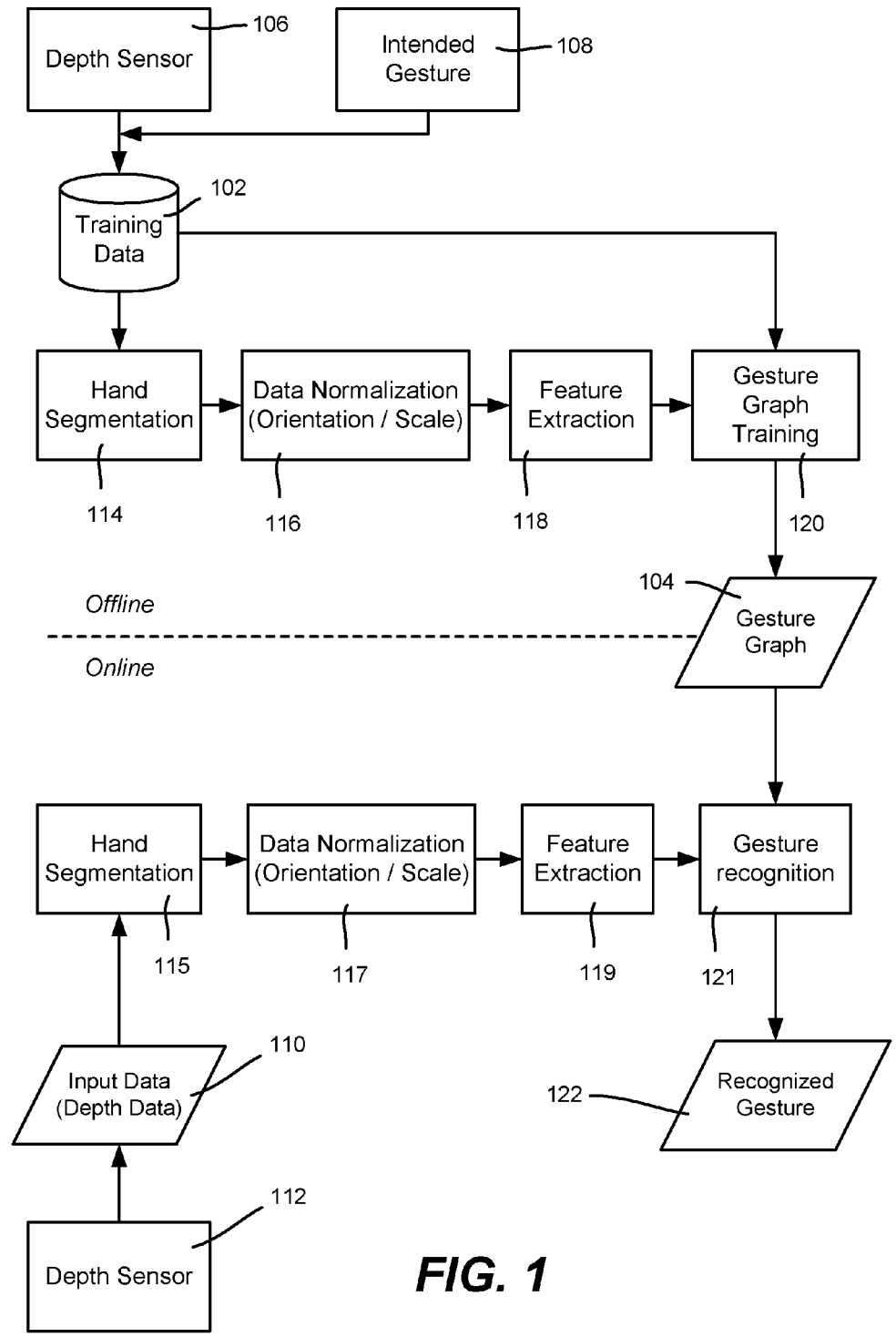
FIG. 1 is a block diagram showing example components of a dynamic hand gesture recognition system according to one example embodiment.

FIG. 1 shows a block diagram comprising an example implementation of a hand gesture recognition system, including an "offline" training portion, and an "online" recognition portion. Recognition may be performed in real-time, e.g., a user can perform hand gestures in front of a depth sensor such as a Kinect™ device, with gesture recognition automatically and dynamically performed; (alternatively, depth data may be sensed and recorded for later recognition). Note that a Kinect™ device comprises a depth camera in which red/green/blue (RGB) color maps along with a depth value (D) are captured for each frame of video, e.g., each pixel in each frame is represented by R, G, B, D. Other depth sensors may be used however, including those separate from an RGB (or other color scheme) camera.

In general, offline machine learning is performed on training data 102 to build a classifier, which in one example implementation comprises a gesture action graph-based classifier 104, which is later used in online dynamic recognition. As will be understood, front-end processing is used for feature extraction, with back-end for classification performed by the action graph as a back-end classifier. Note that this is only one example implementation, and alternative classifiers may be used, e.g., corresponding to MART, Hidden Markov Models (HMM), time-delayed neural networks, finite state machines, and so forth.

Training is based upon the training data 102, comprising frames of depth data (live or recorded) of hand gestures captured by a depth sensor 106 in conjunction with the correct results of what the user intended the gesture to mean, as represented by block 108. Such machine learning/classifier training techniques are well known in other scenarios, and are not described in detail herein for purposes of brevity.

As can be seen in FIG. 1, training and dynamic recognition are generally similar, with dynamic online recognition based upon actual unknown input data 110 captured by a depth sensor 112, e.g., a continuous depth stream. Such a depth sensor 112 also may comprise a depth camera such as a Kinect™ device that also outputs image color data, but may be a separate or different sensor.

Training and online recognition each include a process/mechanism for hand segmentation 114 (offline) and 115 (online), in which for each input depth map, a set of hypothesized hand regions is obtained. To this end, in one implementation, depth data processing (which also may include image processing) first detects a human body or part thereof, and then searches for the hand region inside it; a thresholding may be used to segment the hand, including thresholding based upon a known technique. Note that thresholding and/or region growing techniques may be based upon the assumption that the hand is the closest part of the body to the depth camera.

Note that the set of hypothesized hand regions may contain erroneously segmented regions, and thus hand segmentation 114 and 115 may include tracking and filtering operations. More particularly, at a tracking stage, a tracking process finds correspondence between hypothesized hand regions at current and previous frames, to find a true (or extremely likely) hand region among the hypotheses for the current frame. Non-hand regions are filtered out, resulting in a depth map representing the hand.

As represented via blocks 116 (offline training) and 117 (online recognition), after obtaining the hand region, the hand's position and orientation are determined. The hand is computer-rotated such that the palm is approximately parallel to the image plane. Normalization may be used to compensate for different hand sizes and/or different distances from the sensor, resulting in an orientated, normalized hand depth map.

Feature extraction, as represented via blocks 118 (offline training) and 119 (online recognition), is then performed to extract feature values from the normalized hand depth map for each frame of a set of frames. Features may include types of visual features including cell occupancy features and silhouette features as described herein.

In the offline training stage, given the extracted feature values as captured over a set of frames and the known intended gesture result for the captured gesture, gesture graph training (block 120) is performed to provide the classifier (graph 104). As is known in feature-based classification, the feature values may be arranged as a feature vector.

In the online classification stage, a visual feature vector is similarly obtained from each frame. The feature vectors representative of a gesture is fed (block 121) to the action graph 104 for gesture classification as a recognized gesture 122, e.g., output as a representative numeric value, code, text or the like.

Figure 2A:
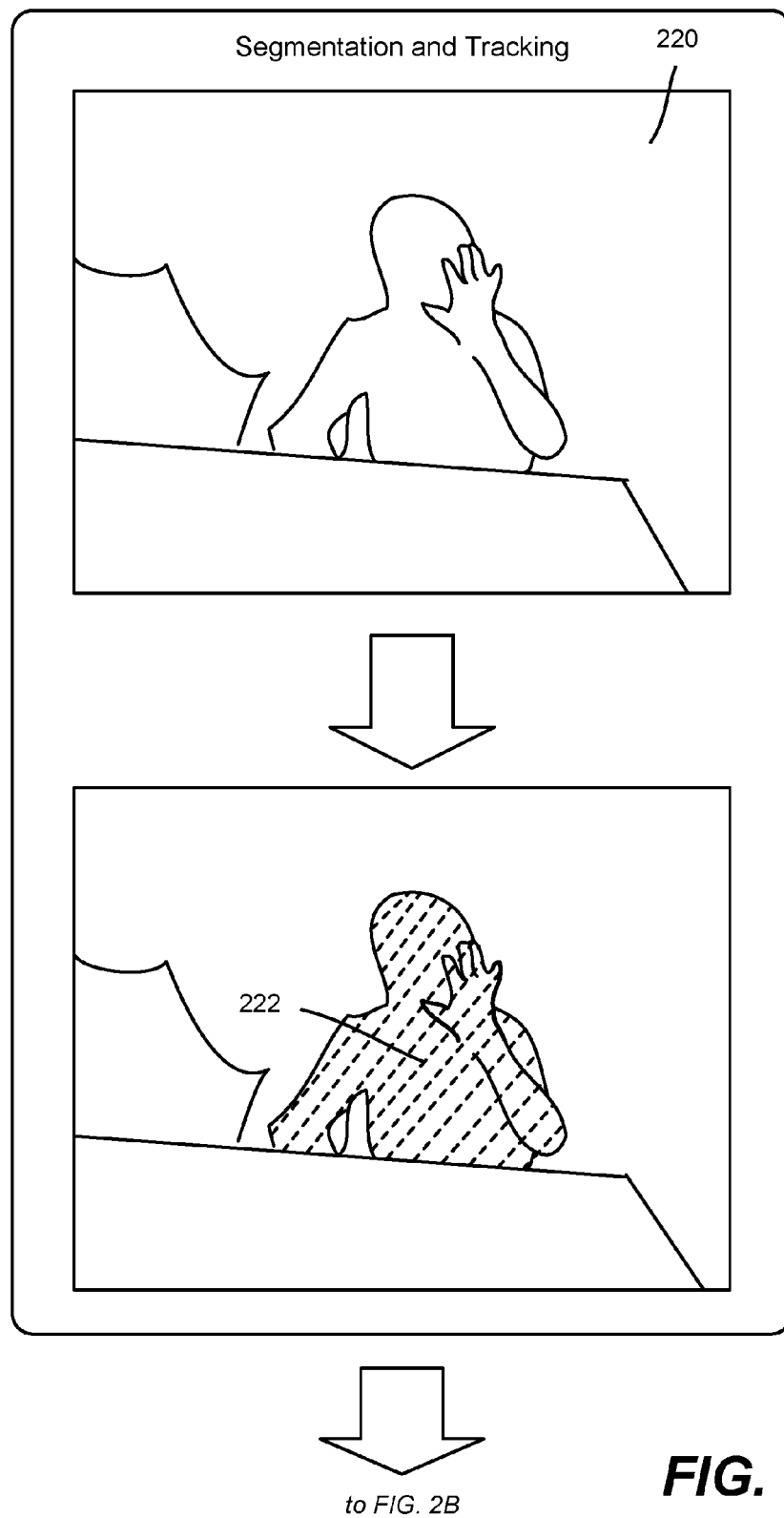
FIGS. 2A and 2B are representations of hand segmenting and tracking to isolate a hand within depth data according to one example embodiment.
Figure 2B:
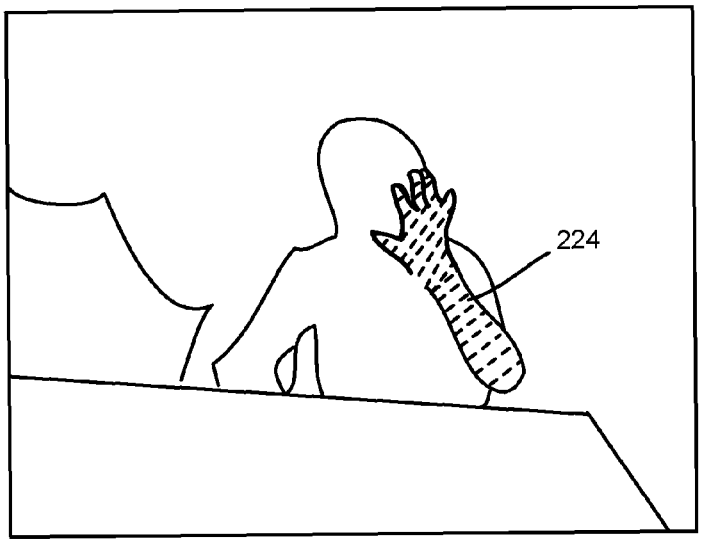
Figure 2B:
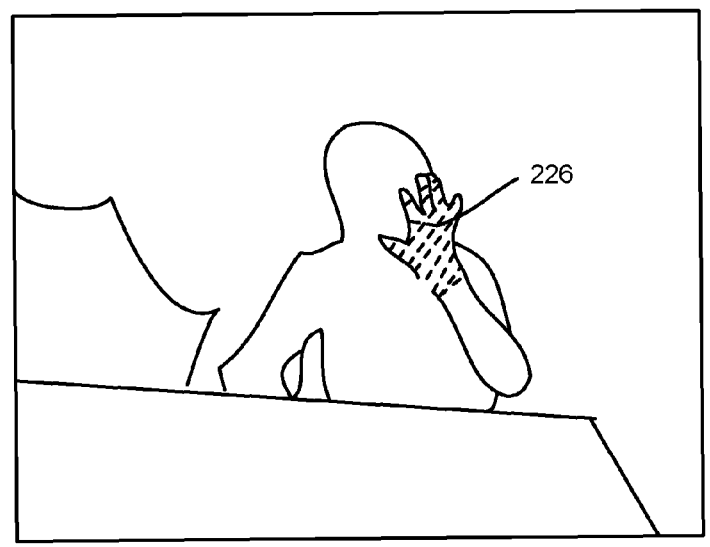

Turning to additional details of segmentation and tracking, as generally represented in FIGS. 2A and 2B, one implementation assumes that there is only a single person in front of the depth camera, that this person occupies a significant portion of the camera's field of view, and that the hand is closer to the camera than the arm and the body. These assumptions are reasonable for many practical scenarios, however alternative implementations may divide the captured depth data into smaller frames to handle multiple users, for example.

Segmentation divides the original depth map for a frame, shown as 220 in FIG. 2A, into a number of blobs using a connected-component labeling algorithm, in which adjacent pixels are connected if the difference between their depth values is less than a pre-specified threshold. The resulting connected components are called blobs. Once the blobs are obtained, the largest blob is found, with other blobs close to the largest blob identified. The following summarizes an overall algorithm, including for separating the arm region from the body.

To find the human body, the algorithm finds the biggest blob, and denotes it as MaxBodyBlob. Let B denote the set of blobs which consists of MaxBodyBlob and the other blobs whose distances from MaxBodyBlob are less than a threshold. The union of the blobs in B is considered as the human body, shown as the lined area 222 in FIG. 2A. Note that any edge detection algorithm followed by connected component labeling may be used to segment depth map into blobs.

Different kind of distance functions may be used, e.g., blobs may be considered as three-dimensional point clouds, using the distance between two point clouds (as minimum distance between each pair of point from one and another point cloud). To find hypothesized hand/arm regions, calculate a depth threshold t based on a known method for the points in the blobs of B. The threshold t is applied to points in B to select the points that are closer to the camera than t. These points form several connected components $H_1, \ldots, H_n$ each of which is a hypothesized hand region.

The true hand region is determined through blob tracking, by establishing correspondences between blobs ($H_1, \ldots, H_n$) in the current frame and those in the previous frames. The blob with the longest track is chosen as the true hand region, shown as the region 224 in FIG. 2B.

The obtained hand region may contain portions of the arm, and thus the geometric size and aspect ratio may be used to determine whether the region needs refinement. If so, the wrist area is identified as the thinnest part of the arm, such that points beyond the wrist are removed, resulting in the region 226 in FIG. 2B.

Figure 3:
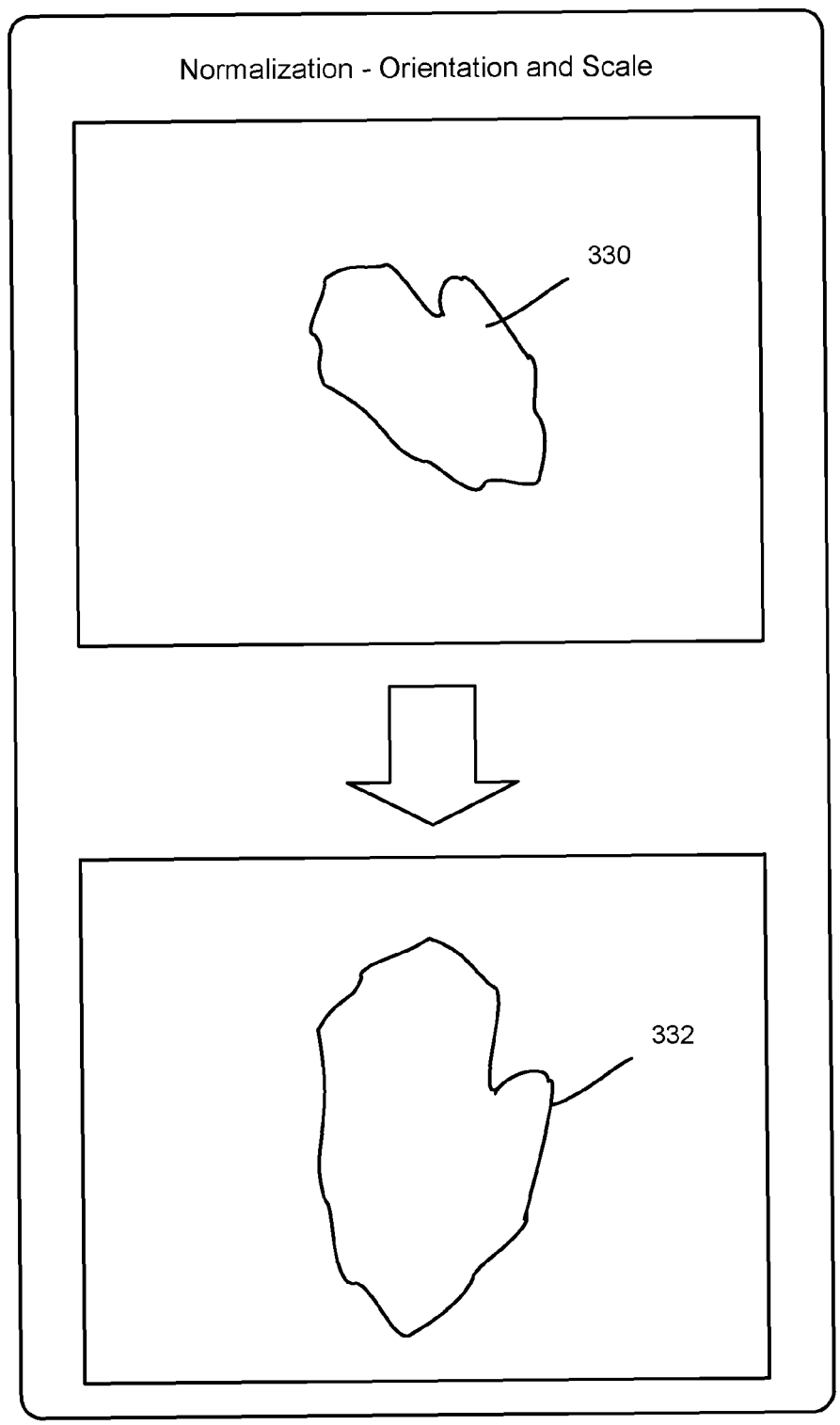
FIG. 3 is a representation of hand normalization to compensate for relative hand orientation and size according to one example embodiment.

Scale and orientation normalization is represented in FIG. 3, and is performed so that the extracted feature descriptors are scale and rotation invariant. For orientation normalization, the hand orientation parameters are estimated from the segmented hand representation 330, with the hand point cloud rotated in such a way that the palm plane is parallel to the image plane and the hand points upward. The normalization algorithm includes in-depth normalization, which fits a plane P to the hand point cloud, and computes a rotation that will rotate P to be parallel to the image plane. This is useful when the visible surface of the hand is approximately planar. If not, in-depth normalization is not performed, as such normalization may result in an overstretched image.

In-plane normalization projects the points onto P and computes the principal direction. An in-plane rotation matrix is computed so that the principal direction points upward after rotation. Scale normalization scales the hand region on P to fit into a predefined rectangle.

After the normalization operations, the rotation parameters are obtained, along with a depth map of the normalized hand mesh 332 (FIG. 3), referred to as HandImg. This HandImg depth "image" along with the rotation parameters, is used at the feature generation stage.

In feature extraction, a feature descriptor is extracted for each frame. Let i denote the index of a frame. Its feature vector $F_i$ has the following form:

$$F_i = \{\vec{v}_i, \vec{r}_i, \vec{s}_i\} \quad (1)$$

where $\vec{v}_i$ is the velocity of the hand center, $\vec{r}_i$ is the rotation parameters of the hand (quaternion in our implementation), and $\vec{s}_i$ is a shape descriptor. Let $\vec{x}_i$ denote the center of gravity of the hand at frame i. The velocity $\vec{v}_i$ is computed as $\vec{v}_i = \vec{x}_i - \vec{x}_{i-1}$.

Figure 4A:
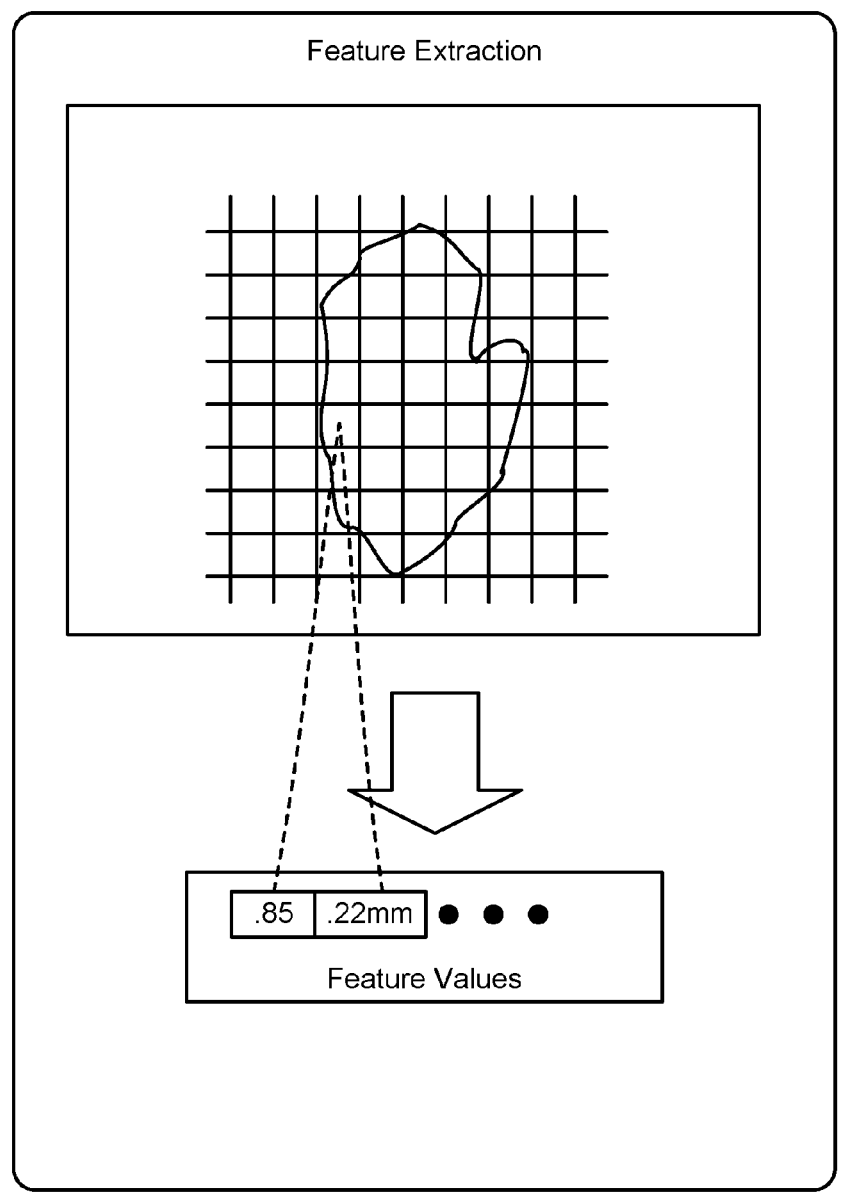
FIGS. 4A and 4B are representations of feature extraction based upon occupancy and silhouette feature value sets according to one example embodiment.

Example shape descriptors include feature values based upon cell occupancy. In one implementation, such values are obtained by dividing the hand image into a uniform grid as represented in FIG. 4A, e.g., a (4×4, 8×8 or 16×16 grid). For each cell of the grid its occupancy (area of the cell occupied by hand mesh) is calculated, as is the average depth after normalization. Values of the average depth may be scaled into a [0,1] range. The occupancy and the average depth of each cell may be combined into the part of the shape descriptor vector $\vec{s}_i$.

Figure 4B:
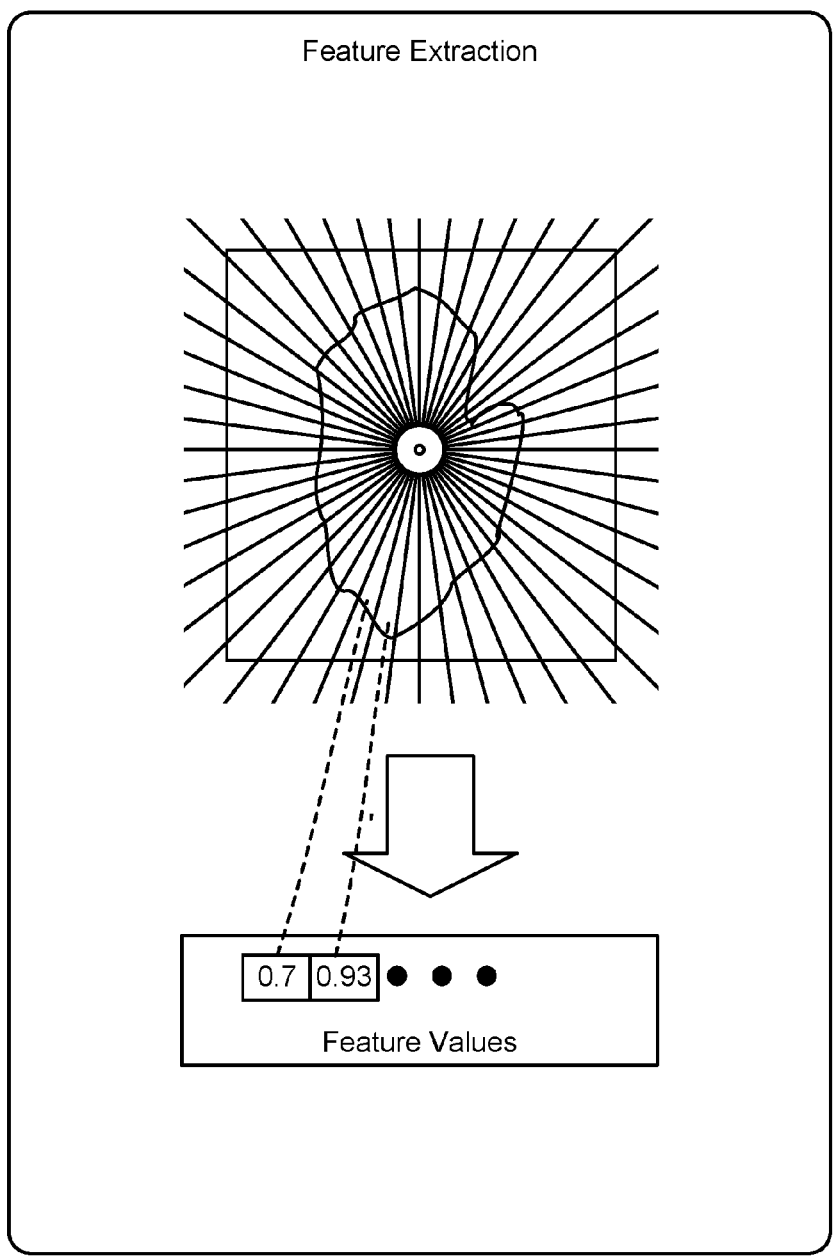

Another set of feature values are extracted based upon silhouette featurization. Silhouette-based feature extraction uses the center of HandImg as an origin, and divides the image into a number of fan-like sectors, as generally represented in FIG. 4B. For each sector, the average distance from the hand contour in the sector to the origin is computed. These distances for the sectors are concatenated into part of the shape descriptor vector $\vec{s}_i$. Note that due to the large dimensionality of the cell occupancy and silhouette shape descriptors, dimensionality reduction may be performed using the Principal Component Analysis (PCA), e.g., choosing the first several PCA coefficients for the shape descriptor.

As described above, for the back-end classifier used for gesture recognition, an action graph approach is used. An action graph is represented as a quadruplet $$\Gamma = (\Omega, \Lambda, G, \Psi) \quad (2)$$

where $\Omega = \{\omega_1, \ldots, \omega_M\}$ is the set of key postures, $\Lambda = \{p(x|\omega_1), \ldots, p(x|\omega_M)\}$ is the observation likelihood model, $G = \{\Omega, A, A_1, \ldots, A_L\}$ is the set of transition matrices (a global transition matrix, and a transition matrix for each gesture type), and $\Psi$ is a set of gesture labels. The training procedure for the action graph includes key posture learning and transition matrix learning. To learn the key postures, cluster the feature vectors of the gesture types in the training data using a K-means clustering procedure. There is a single feature vector per frame. For each cluster, fit a Gaussian distribution and estimate the observation likelihood model $p(x|\omega_M)$. The transition matrices (global transition matrix A and transition matrices=$\{A_1, \ldots, A_L\}$ or each gesture) are computed as $p(j|i) = N_{i \to j}/N_i$, where $p(j|i)$ is the transition probability from state i to state j, $N_{i \to j}$ is the number of transitions from i to j in the training data, and $N_i = \Sigma_j N_{i \to j}$ is the number of times state i is observed in the training data. For the global transition matrix A, the transitions in all the training sequences may be considered. For the transition matrix $A_k$ for gesture k, consider only the transitions in the training sequences belonging to gesture k. If the amount of training data is small, the transition matrices are usually very sparse, whereby a small regularization value $\xi$ may be added to the transition matrix, and normalized them so that $\Sigma_j p(j|i) = 1$; $\xi$ may be in the range from 0.0001 to 0.01, such as 0.001.

Various decoding schemes may be used, including Action-Specific Viterbi Decoding (ASVD), which is similar to the classical HMM decoding scheme. For each gesture, compute the most likely path in the action graph:

$$L(\psi_i) = \max_s p(\psi_i) \prod_t p(s_t | s_{t-1}, \psi_i) p(x_t | s_t). \quad (3)$$

The gesture with the largest likelihood is the classification decision:

$$\hat{\psi} = \arg \max_{\psi_i} L(\psi_i). \quad (4)$$

Uni-Gram and Bi-Gram Global Viterbi Decoding operates by finding the most likely path (common for all actions) using a global transition matrix:

$$s^* = \arg \max_s \prod_t p(s_t | s_{t-1}) p(x_t | s_t). \quad (5)$$

The gesture is then decoded as the following:

$$\hat{\psi} = \arg \max_{\psi_i} p(\psi_i) \prod_t p(s_t^* | \psi_i) - \text{Uni-Gram} \quad (6)$$

$$\hat{\psi} = \arg \max_{\psi_i} p(\psi_i) \prod_t p(s_t^* | s_{t-1}^*, \psi_i) - \text{Bi-Gram} \quad (7)$$

Uni-Gram and Bi-Gram Maximum Likelihood Decoding (UMLD and BMLD) are similar to UGVD and BGVD, with the difference being the way to find the most likely path:

$$s^* = \arg \max_s \prod_t p(x_t | s_t) \quad (8)$$

Once the most likely path is found, equations (6) or (7) are used for gesture decoding, for Uni-Gram and Bi-Gram Maximum Likelihood Decoding, respectively.

Figure 5:
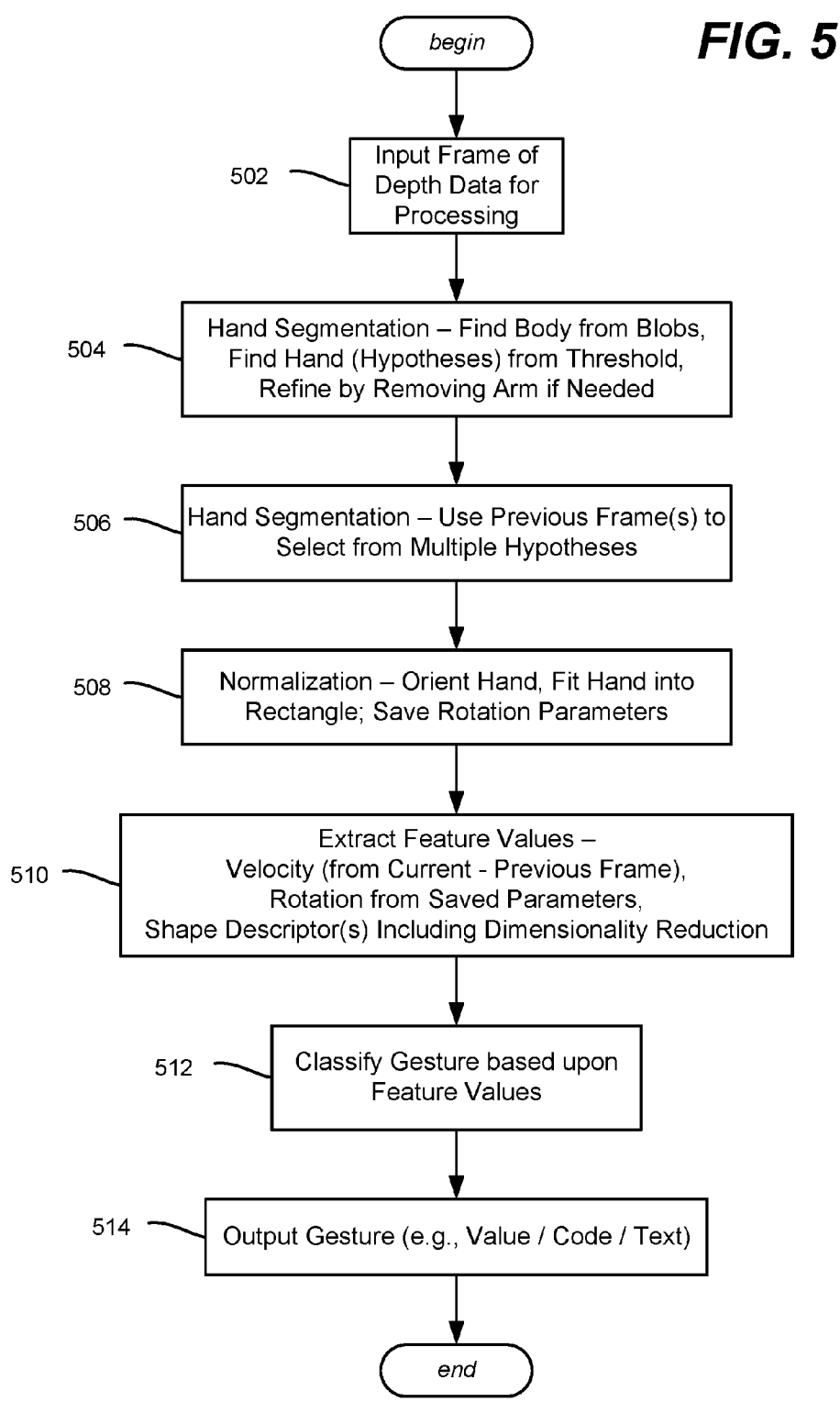
FIG. 5 is a flow diagram representing example steps that may be taken to process depth data for hand gesture recognition according to one example embodiment.

FIG. 5 is a flow diagram showing various example steps related towards dynamic recognition of an unknown hand gesture as sensed via frames of depth data. At step 502, a frame of the depth data is input for processing. Note that this may be a sampling of a smaller subset of all frames, or may be all of the frames (although the first frame may only be used as a previous frame so that a previous frame is available).

Step 504 represents part of the depth data processing, namely hand segmentation to isolate the hand within the depth data as described above. In one example implementation, this includes finding a body via blobs, finding a hand (or hand hypotheses) within the body blob, e.g., using threshold depth comparisons, and refining the depth data to remove an arm portion if needed. As there may be multiple hypotheses, step 506 represents the use of previous frame information to select a most likely hypothesis as the isolated hand.

Step 508 represents compensating via normalization to orient and/or scale the hand as needed to a desired orientation and scale, respectively. As described herein, the rotation parameters may be saved as a feature value set comprising one or more rotation-based feature values.

Step 510 represents extracting feature values for other feature value sets. This includes determining a velocity feature value (which may be a set of one or more feature values) based upon hand movement between the current frame and the previous frame. Feature value sets also may be extracted from the rotation parameters (saved at step 508), and from shape descriptor data.

Step 512 represents classifying the gesture based upon the extracted feature values. Typically this includes inputting feature data (e.g., a feature vector) representative of at least some of the feature values into the classifier. A recognized gesture is then output, e.g., in the form of a numeric value, code and/or text representing that gesture. For example, if the gesture is sign language for an alphabetic letter or number, the letter or number may be output in Unicode or another coding system; if sign language for a word or phrase, text spelling out that word or phrase may be output.

Example Operating Environment

Figure 6:
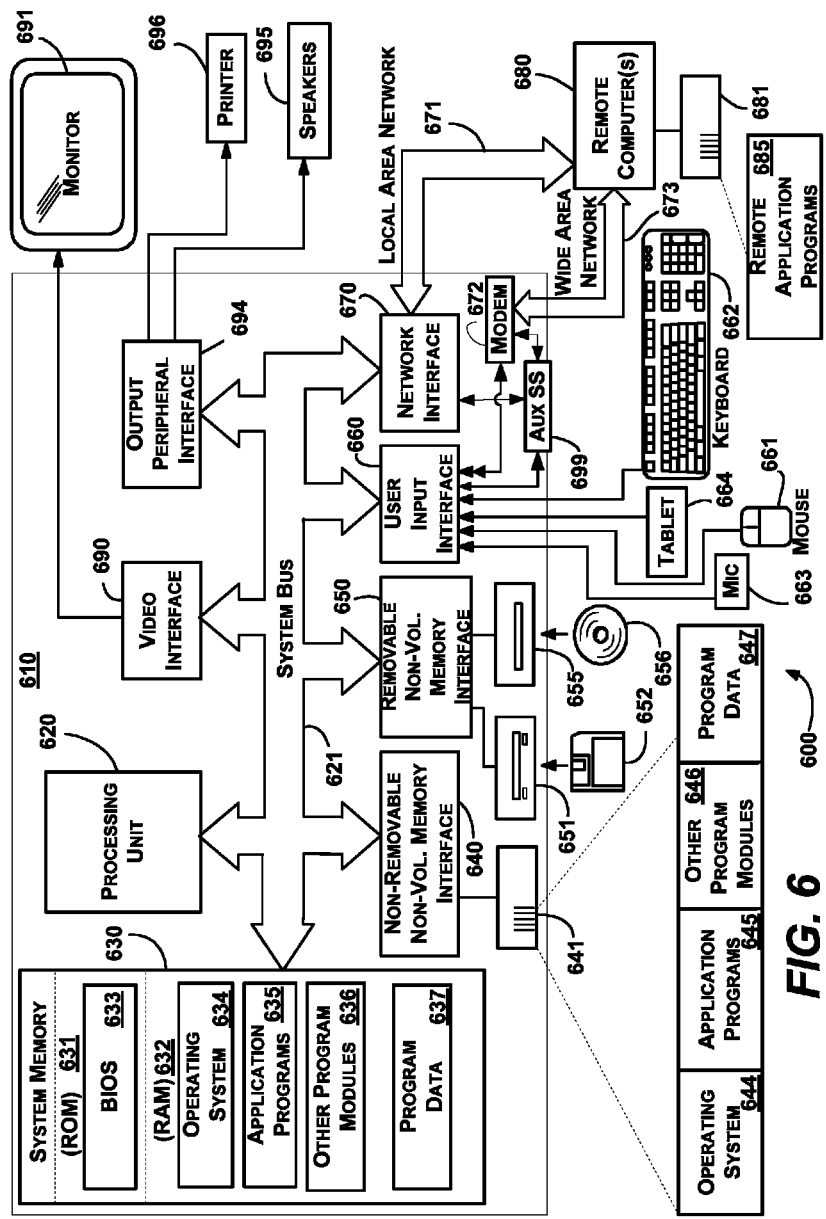
FIG. 6 is a block diagram representing an example computing environment into which aspects of the subject matter described herein may be incorporated.

FIG. 6 illustrates an example of a suitable computing and networking environment 600 into which the examples and implementations of any of FIGS. 1-5 may be implemented, for example. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the example operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an example system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are examples and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor, the method comprising:
   detecting a hand by:
      identifying a wrist area as a thinnest part of an arm portion; and
      separating the arm portion at the identified wrist area;
   segmenting depth data to isolate the hand represented in a plurality of frames that include hand movement;
   rotating the hand such that a palm of the hand has a normalized and oriented position relative to an image plane;
   extracting feature values corresponding to the rotated hand; and
   recognizing the hand movement as a hand gesture based upon the feature values.

2. The method of claim 1, wherein extracting the feature values corresponding to the hand comprises extracting feature values based upon hand velocity data.

3. The method of claim 1, further comprising
   processing the depth data by:
      dividing an original depth map for a frame into a plurality of blobs by connecting adjacent pixels if a difference between depth values of the pixels is less than a pre-defined threshold;
      determining a largest blob of the plurality of blobs;
      identifying blobs within a predefined distance of the largest blob; and
      classifying the largest blob and the blobs within the predefined distance of the largest blob as a human body.

4. The method of claim 1, further comprising detecting the hand by:
   segmenting the depth data into a human shape, and
   wherein detecting the hand is further based upon depth data of the hand relative to depth data of the human shape.

5. The method of claim 1 wherein detecting the hand further comprises refining an object that includes an arm portion and a hand portion.

6. The method of claim 1, wherein extracting the feature values corresponding to the hand comprises extracting feature values based on one or more of the following: one or more hand rotation parameters, and at least one shape descriptor.

7. The method of claim 1, wherein extracting the feature values corresponding to the hand comprises extracting shape descriptor feature values based upon one or more occupancy features.

8. The method of claim 1, wherein extracting the feature values corresponding to the hand comprises extracting shape descriptor feature values based upon one or more silhouette features.

9. A system comprising:
   a memory;
   a computing device; and
   a processor programmed to:
      detect a hand by:
         identifying a wrist area as a thinnest part of an arm portion; and
         separating the arm portion at the identified wrist area;
      segment depth data to isolate the hand represented in a plurality of frames that include hand movement;
      rotate the hand such that a palm of the hand has a normalized and oriented position relative to an image plane;
      extract feature values corresponding to the rotated hand; and
      recognize the hand movement as a hand gesture based upon the feature values.

10. The system of claim 9, wherein extracting the feature values corresponding to the hand comprises extracting feature values based upon hand velocity data.

11. The system of claim 9, wherein the processor is further programmed to:
    process the depth data by:
       dividing an original depth map for a frame into a plurality of blobs by connecting adjacent pixels if a difference between depth values of the pixels is less than a pre-defined threshold;
       determining a largest blob of the plurality of blobs;
       identifying blobs within a predefined distance of the largest blob; and
       classifying the largest blob and the blobs within the predefined distance of the largest blob as a human body.

12. The system of claim 9, wherein the processor is further programmed to detect the hand by: segmenting the depth data into a human shape.

13. The system of claim 9, wherein the processor is further programmed to detect the hand by: refining an object that includes an arm portion and a hand portion.

14. The system of claim 9, wherein the processor is further programmed to:
    identify a hand region; and
    determine that the identified hand region includes a portion of an arm and a portion of the hand.

15. The system of claim 9, wherein the processor is further programmed to detect the hand by:
    determining a plurality of hypothesized hand regions; and
    determining a hand region from among the hypothesized hand regions based upon processing one or more previous frames of depth data.

16. The system of claim 9, wherein extracting the feature values corresponding to the hand comprises extracting shape descriptor feature values based upon one or more silhouette features.

17. One or more computer-readable storage devices having computer-executable instructions, which when executed perform operations comprising:
    detecting a hand by:
       identifying a wrist area as a thinnest part of an arm portion; and
       separating the arm portion at the identified wrist area;
    segmenting depth data to isolate the hand represented in a plurality of frames that include hand movement;
    rotating the hand such that a palm of the hand has a normalized and oriented position relative to an image plane;
    extracting feature values corresponding to the rotated hand; and
    recognizing the hand movement as a hand gesture based upon the feature values.

18. The one or more computer-readable storage devices of claim 17, wherein extracting the feature values corresponding to the hand comprises extracting a hand velocity feature value set, a hand rotation feature value set, and a hand shape descriptor feature set.

19. The one or more computer-readable storage devices of claim 17, further comprising further computer-executable instructions, which when executed perform operations comprising:
    processing the depth data by:
       dividing an original depth map for a frame into a plurality of blobs by connecting adjacent pixels if a difference between depth values of the pixels is less than a pre-defined threshold;
       determining a largest blob of the plurality of blobs;
       identifying blobs within a predefined distance of the largest blob; and
    classifying the largest blob and the blobs within the predefined distance of the largest blob as a human body.

20. The one or more computer-readable storage devices of claim 17, further comprising further computer-executable instructions, which when executed perform operations comprising detecting the hand by: refining an object that includes an arm portion and a hand portion.

* * * * *